(12) United States Patent
Martin et al.

(10) Patent No.: US 9,830,049 B2
(45) Date of Patent: Nov. 28, 2017

(54) APPARATUS AND METHOD FOR PROVIDING A VISUAL TRANSITION BETWEEN SCREENS

(75) Inventors: John Hillerich Martin, Atherton, CA (US); Andrew Borovsky, New York, NY (US)

(73) Assignee: Nokia Technologies Oy, Espoo (FI)

( * ) Notice: Subject to any disclaimer, the term of this patent is extended or adjusted under 35 U.S.C. 154(b) by 395 days.

(21) Appl. No.: 13/323,132

(22) Filed: Dec. 12, 2011

(65) Prior Publication Data
US 2013/0147825 A1    Jun. 13, 2013

(51) Int. Cl.
| G06F 3/0483 | (2013.01) |
| G06F 3/0485 | (2013.01) |
| G06F 3/0488 | (2013.01) |

(52) U.S. Cl.
CPC .......... *G06F 3/0483* (2013.01); *G06F 3/0485* (2013.01); *G06F 3/04883* (2013.01)

(58) Field of Classification Search
CPC .. G06F 3/0485; G06F 3/04855; G06F 3/0481; G06F 17/211; G06F 3/002; G06F 17/24; G06F 3/0482; G06F 3/0488; G06F 3/04883; G06F 3/04886; G06F 3/016; G06F 3/017; G06F 2203/04806; G06F 2203/04807; G09G 5/34; G09G 5/14; G06Q 10/10; H04M 1/72583
(Continued)

(56) References Cited

U.S. PATENT DOCUMENTS

| 5,463,725 A | 10/1995 | Henckel et al. |
| 5,559,961 A | 9/1996 | Blonder |

(Continued)

FOREIGN PATENT DOCUMENTS

| CN | 1977234 A | 6/2007 |
| CN | 1985234 A | 6/2007 |

(Continued)

OTHER PUBLICATIONS

"Flex 4.5—Using Mobile View Transitions"; Downloaded from http://devgirl.org/2011/05/12/flex-4-5-using-mobile-view-transitions/ Published on May 12, 2011.
(Continued)

*Primary Examiner* — Ulka Chauhan
*Assistant Examiner* — Sae Won Yoon
(74) *Attorney, Agent, or Firm* — Alston & Bird LLP

(57) ABSTRACT

An apparatus, method, and computer program product are described that provide for the display of a visual transition between screens representing different interactive content to indicate to a user that the user is "leaving" (e.g., transitioning away) from one screen and is "entering" (e.g., transitioning to) another screen. In particular, a first graphical effect may be applied to a first screen and a second, different graphical effect may be applied to the second screen. The first graphical effect may be indicative of a transition from display of the first screen to non-display of the first screen, while the second graphical effect may be indicative of a transition from non-display of the second screen to display of the second screen. The combination of the first and second graphical effects may, thus, create for the user a visual transition from the first screen to the second screen.

20 Claims, 12 Drawing Sheets

FIG. 6A

(58) Field of Classification Search
USPC .......... 345/589; 715/764–767, 784, 732, 830
See application file for complete search history.

(56) References Cited

U.S. PATENT DOCUMENTS

| | | | |
|---|---|---|---|
| 5,754,306 A | 5/1998 | Taylor et al. | |
| 5,884,185 A | 3/1999 | Kim | |
| 6,055,439 A | 4/2000 | Helin et al. | |
| 6,249,606 B1 | 6/2001 | Kiraly et al. | |
| 6,628,310 B1 | 9/2003 | Hiura et al. | |
| 6,799,061 B2 | 9/2004 | Jeoung | |
| 6,920,619 B1 | 7/2005 | Milekic | |
| 7,394,347 B2 | 7/2008 | Kady | |
| 7,453,443 B2 | 11/2008 | Rytivaara et al. | |
| 7,480,870 B2 | 1/2009 | Anzures et al. | |
| 7,487,467 B1 | 2/2009 | Kawahara et al. | |
| 7,509,140 B2 | 3/2009 | Elomaa | |
| 7,593,000 B1 | 9/2009 | Chin | |
| 7,610,599 B1 | 10/2009 | Nashida et al. | |
| 7,657,849 B2 | 2/2010 | Chaudhri et al. | |
| 7,676,767 B2 | 3/2010 | Hofmeister et al. | |
| 7,683,888 B1 | 3/2010 | Kennedy | |
| 7,865,839 B2* | 1/2011 | Heikes et al. | 715/805 |
| 7,907,203 B2 | 3/2011 | Sugiyama et al. | |
| 7,917,861 B2* | 3/2011 | Boettcher et al. | 715/765 |
| 8,082,523 B2 | 12/2011 | Forstall et al. | |
| 8,127,254 B2 | 2/2012 | Lindberg et al. | |
| 8,130,206 B2 | 3/2012 | Lindroos | |
| 8,209,637 B2 | 6/2012 | Chaudhri et al. | |
| 8,314,777 B2* | 11/2012 | Ikeda et al. | 345/173 |
| 8,341,557 B2 | 12/2012 | Pisula et al. | |
| 8,427,445 B2 | 4/2013 | Kennedy | |
| 8,443,199 B2 | 5/2013 | Kim et al. | |
| 8,607,147 B2 | 12/2013 | Dames et al. | |
| 8,704,774 B2 | 4/2014 | Chang | |
| 8,854,318 B2 | 10/2014 | Borovsky et al. | |
| 8,988,357 B2 | 3/2015 | Hope | |
| 9,049,302 B2 | 6/2015 | Forstall et al. | |
| 2001/0017934 A1 | 8/2001 | Paloniemi et al. | |
| 2003/0090506 A1 | 5/2003 | Moore et al. | |
| 2004/0061788 A1 | 4/2004 | Bateman | |
| 2004/0210845 A1* | 10/2004 | Paul et al. | 715/731 |
| 2005/0034083 A1 | 2/2005 | Jaeger | |
| 2005/0060653 A1 | 3/2005 | Fukase et al. | |
| 2005/0079896 A1 | 4/2005 | Kokko et al. | |
| 2005/0181821 A1 | 8/2005 | Elomaa | |
| 2005/0223247 A1 | 10/2005 | Hohnke | |
| 2006/0026535 A1 | 2/2006 | Hotelling et al. | |
| 2006/0075250 A1 | 4/2006 | Liao | |
| 2006/0284852 A1 | 12/2006 | Hofmeister et al. | |
| 2007/0016958 A1 | 1/2007 | Bodepudi et al. | |
| 2007/0028176 A1 | 2/2007 | Perdomo et al. | |
| 2007/0067734 A1 | 3/2007 | Cunningham et al. | |
| 2007/0120689 A1 | 5/2007 | Zerhusen et al. | |
| 2007/0135043 A1 | 6/2007 | Hayes et al. | |
| 2007/0150826 A1 | 6/2007 | Anzures et al. | |
| 2007/0150834 A1 | 6/2007 | Muller et al. | |
| 2007/0150842 A1 | 6/2007 | Chaudhri et al. | |
| 2007/0159842 A1 | 7/2007 | Cole | |
| 2007/0189737 A1 | 8/2007 | Chaudhri et al. | |
| 2007/0250787 A1* | 10/2007 | Kawahara et al. | 715/782 |
| 2008/0020803 A1 | 1/2008 | Rios et al. | |
| 2008/0052945 A1* | 3/2008 | Matas et al. | 34/173 |
| 2008/0057926 A1 | 3/2008 | Forstall et al. | |
| 2008/0168379 A1 | 7/2008 | Forstall et al. | |
| 2008/0184112 A1 | 7/2008 | Chiang et al. | |
| 2008/0220752 A1 | 9/2008 | Forstall et al. | |
| 2008/0282158 A1 | 11/2008 | Aaltonen et al. | |
| 2009/0006991 A1 | 1/2009 | Lindberg et al. | |
| 2009/0007017 A1* | 1/2009 | Anzures et al. | 715/835 |
| 2009/0064047 A1 | 3/2009 | Shim et al. | |
| 2009/0091544 A1 | 4/2009 | Lindroos | |
| 2009/0094562 A1* | 4/2009 | Jeong et al. | 715/863 |
| 2009/0109184 A1* | 4/2009 | Kim et al. | 345/173 |
| 2009/0119595 A1* | 5/2009 | Morris et al. | 715/730 |
| 2009/0172549 A1* | 7/2009 | Davidson | 715/732 |
| 2009/0205041 A1 | 8/2009 | Michalske | |
| 2009/0231271 A1 | 9/2009 | Heubel et al. | |
| 2009/0249240 A1* | 10/2009 | Lundy et al. | 715/771 |
| 2009/0264159 A1 | 10/2009 | Hsieh et al. | |
| 2009/0267909 A1 | 10/2009 | Chen et al. | |
| 2009/0271731 A1* | 10/2009 | Lin et al. | 715/776 |
| 2009/0289916 A1 | 11/2009 | Dai | |
| 2009/0293007 A1 | 11/2009 | Duarte et al. | |
| 2010/0007613 A1* | 1/2010 | Costa | 345/173 |
| 2010/0070931 A1 | 3/2010 | Nichols | |
| 2010/0081475 A1 | 4/2010 | Chiang et al. | |
| 2010/0088643 A1 | 4/2010 | Ota et al. | |
| 2010/0095206 A1 | 4/2010 | Kim | |
| 2010/0095240 A1 | 4/2010 | Shiplacoff et al. | |
| 2010/0125905 A1* | 5/2010 | Samuels | 715/702 |
| 2010/0162182 A1 | 6/2010 | Oh et al. | |
| 2010/0205563 A1* | 8/2010 | Haapsaari et al. | 715/825 |
| 2010/0211872 A1* | 8/2010 | Rolston et al. | 715/702 |
| 2010/0231533 A1 | 9/2010 | Chaudhri | |
| 2010/0235794 A1 | 9/2010 | Ording | |
| 2010/0248689 A1* | 9/2010 | Teng et al. | 455/411 |
| 2010/0257438 A1* | 10/2010 | Becerra, Sr. | G06F 3/0485 715/204 |
| 2010/0257490 A1 | 10/2010 | Lyon et al. | |
| 2010/0269040 A1 | 10/2010 | Lee | |
| 2010/0293330 A1* | 11/2010 | Maloney et al. | 711/118 |
| 2010/0299598 A1* | 11/2010 | Shin et al. | 715/702 |
| 2010/0306693 A1 | 12/2010 | Brinda | |
| 2010/0306705 A1 | 12/2010 | Nilsson | |
| 2011/0105193 A1 | 5/2011 | Lee et al. | |
| 2011/0131531 A1* | 6/2011 | Russell et al. | 715/835 |
| 2011/0154196 A1* | 6/2011 | Icho et al. | 715/702 |
| 2011/0167380 A1* | 7/2011 | Stallings et al. | 715/784 |
| 2011/0187724 A1* | 8/2011 | Oh et al. | 345/473 |
| 2011/0209057 A1* | 8/2011 | Hinckley et al. | 715/702 |
| 2011/0225543 A1 | 9/2011 | Arnold et al. | |
| 2011/0271181 A1 | 11/2011 | Tsai et al. | |
| 2011/0291945 A1* | 12/2011 | Ewing, Jr. | G06F 1/1686 345/173 |
| 2011/0296351 A1* | 12/2011 | Ewing, Jr. | G06F 3/0346 715/841 |
| 2012/0023453 A1 | 1/2012 | Wagner | |
| 2012/0036556 A1 | 2/2012 | LeBeau et al. | |
| 2012/0054680 A1 | 3/2012 | Moonka et al. | |
| 2012/0079421 A1* | 3/2012 | Arriola | G06F 3/04812 715/784 |
| 2012/0084738 A1* | 4/2012 | Sirpal | 715/863 |
| 2012/0098639 A1 | 4/2012 | Ijas | |
| 2012/0124512 A1 | 5/2012 | Lindberg et al. | |
| 2012/0223890 A1 | 9/2012 | Borovsky et al. | |
| 2012/0284673 A1* | 11/2012 | Lamb | G06F 3/04883 715/863 |
| 2012/0319984 A1 | 12/2012 | Borovsky et al. | |
| 2013/0227453 A1 | 8/2013 | Tsai | |
| 2013/0239045 A1 | 9/2013 | Lindberg et al. | |
| 2013/0239065 A1 | 9/2013 | Lindberg et al. | |
| 2013/0246971 A1 | 9/2013 | Lindberg et al. | |

FOREIGN PATENT DOCUMENTS

| | | |
|---|---|---|
| CN | 101571785 A | 11/2009 |
| EP | 1 032 183 A2 | 8/2000 |
| EP | 1 450 248 A1 | 8/2004 |
| EP | 2 230 623 A1 | 9/2010 |
| EP | 2 256 610 A1 | 12/2010 |
| EP | 2 282 275 A1 | 2/2011 |
| EP | 2 284 646 A1 | 2/2011 |
| GB | 2 310 567 A | 8/1997 |
| JP | 2000-347784 | 12/2000 |
| JP | 2003-298715 | 10/2003 |
| JP | 2005-122271 | 5/2005 |
| JP | 2006-113637 | 4/2006 |
| JP | 2007-72233 A | 3/2007 |
| KR | 100725522 B1 | 5/2007 |
| TW | 2010 20876 A | 6/2010 |
| WO | WO 00/33570 A1 | 6/2000 |
| WO | WO 2005/101172 | 10/2005 |

(56) References Cited

FOREIGN PATENT DOCUMENTS

| WO | WO 2006/048028 A1 | 5/2006 |
| --- | --- | --- |
| WO | WO 2008/116395 A1 | 10/2008 |
| WO | WO 2010/040670 A2 | 4/2010 |
| WO | WO 2011/100623 A2 | 8/2011 |

OTHER PUBLICATIONS

"LauncherPro Plus Home Screen Transition Effects Effects on CyanogenMod 7—RC 2 Motorola Milestone"; Downloaded from http://www.youtube.com/watch?v=bRcMAOLsBP4; Published on Mar. 6, 2011.
"DevTools for .NET"; Downloaded from http://www.telerik.com/community/forums/windows-phone/transition-control/transition-from-page-to-page.aspx; Published on Nov. 16, 2010.
"Interfaces That Flow: Transitions as Design Elements"; Downloaded from http://www.uxmatters.com/mt/archives/2007/04/interfaces-that-flow-transitions-as-elements.php; Published on Apr. 26, 2007.
Mixed molo:5 Best Things About iOs4 [online] [retrieved Jan. 17, 2012]. Retrieved from the Internet: <URL: http://migmol.blogspot.com/2010/06/5-best-things-about-ios4.html>. 6 pages.
Shaky Beginnings: Mar. 2010 [online] [retrieved Jan. 17, 2012]. Retrieved from the Internet: <URL: http://rs250-squid.blogspot.com/2010_03_01_archive.html>. 5 pages.
International Search Report and Written Opinion for Application No. PCT/FI2012/051220, dated Apr. 25, 2013.
Sprint Personal Communication Services, User Guide, QUALCOMM QCP-2700/2700F Sony CM-B1201SPR (Jul. 1997) 78 pages.
Written Opinion from International Application No. PCT/FI2011/050739, dated Dec. 16, 2011.
International Search Report from International Application No. PCT/FI2011/050739, dated Dec. 16, 2011.
International Search Report and Written Opinion for Application No. PCT/FI2011/050776 dated Dec. 27, 2011.
International Search Report and Written Opinion from International Application No. PCT/IB2008/001662, dated Dec. 15, 2009.
Office Action for Chinese Application No. 2008-800222885, dated Nov. 23, 2011.
Office Action for European Application No. EP 08 776 289.4 dated Apr. 26, 2013.
European Search Report for Application No. 13159698 dated Sep. 9, 2013.
Office Action for Korean Application No. 10-2010-7002006, dated Aug. 23, 2011.
Office Action for U.S. Appl. No. 12/874,206 dated Apr. 8, 2013.
Office Action for U.S. Appl. No. 12/874,206 dated Oct. 23, 2013.
Office Action in U.S. Appl. No. 13/594,238 dated Nov. 19, 2012.
Office Action in U.S. Appl. No. 13/594,238 dated May 29, 2013.
Office Action for U.S. Appl. No. 13/889,750 dated Oct. 15, 2013.
Office Action for U.S. Appl. No. 12/874,206 dated May 23, 2014.
Office Action for U.S. Appl. No. 13/594,238 dated May 28, 2014.
Office Action for U.S. Appl. No. 13/889,750 dated May 20, 2014.
Supplementary European Search Report for Application No. EP 11 82 1164 dated Apr. 2, 2014.
Office Action for U.S. Appl. No. 13/357,143 dated Jul. 2, 2014.
Office Action for U.S. Appl. No. 13/594,238 dated Nov. 20, 2014.
Notice of Allowance for U.S. Appl. No. 13/594,238 dated Mar. 30, 2015.
Notice of Allowance for U.S. Appl. No. 13/594,238 dated Jun. 29, 2015.
Office Action for Taiwanese Application No. 10420180120 dated Feb. 10, 2015.
Office Action for U.S. Appl. No. 13/866,475 dated Jun. 4, 2015.
Office Action for U.S. Appl. No. 13/866,455 dated Jun. 16, 2015.
Office Action for U.S. Appl. No. 14/936,012 dated Feb. 2, 2016.
Oral Proceeding for EP 13159698.3 dated Feb. 11, 2016.
Oral Proceeding Communication for EP 13159698.3 dated Jan. 25, 2016.
Office Action in Chinese Application No. CN201180051632.5 dated Feb. 6, 2016, with English Summary, 15 pages.
Extended European Search Report for corresponding European Application No. 12196635.2 dated Oct. 22, 2015, 6 pages.
Office Action for corresponding European Application No. 08 776 2894.4 dated Oct. 21, 2015
Notice of Allowance for U.S. Appl. No. 13/866,475 dated Dec. 9, 2015.
Office Action for U.S. Appl. No. 13/866,455 dated Jan. 14, 2016.
Office Action for European Application No. EP 08 776 289.4 dated Jul. 29, 2016.
Office Action from U.S. Appl. No. 14/936,012 dated Jul. 28, 2016.
Notice of Allowance for U.S. Appl. No. 14/936,012, dated Dec. 19, 2016, 19 pages.

* cited by examiner

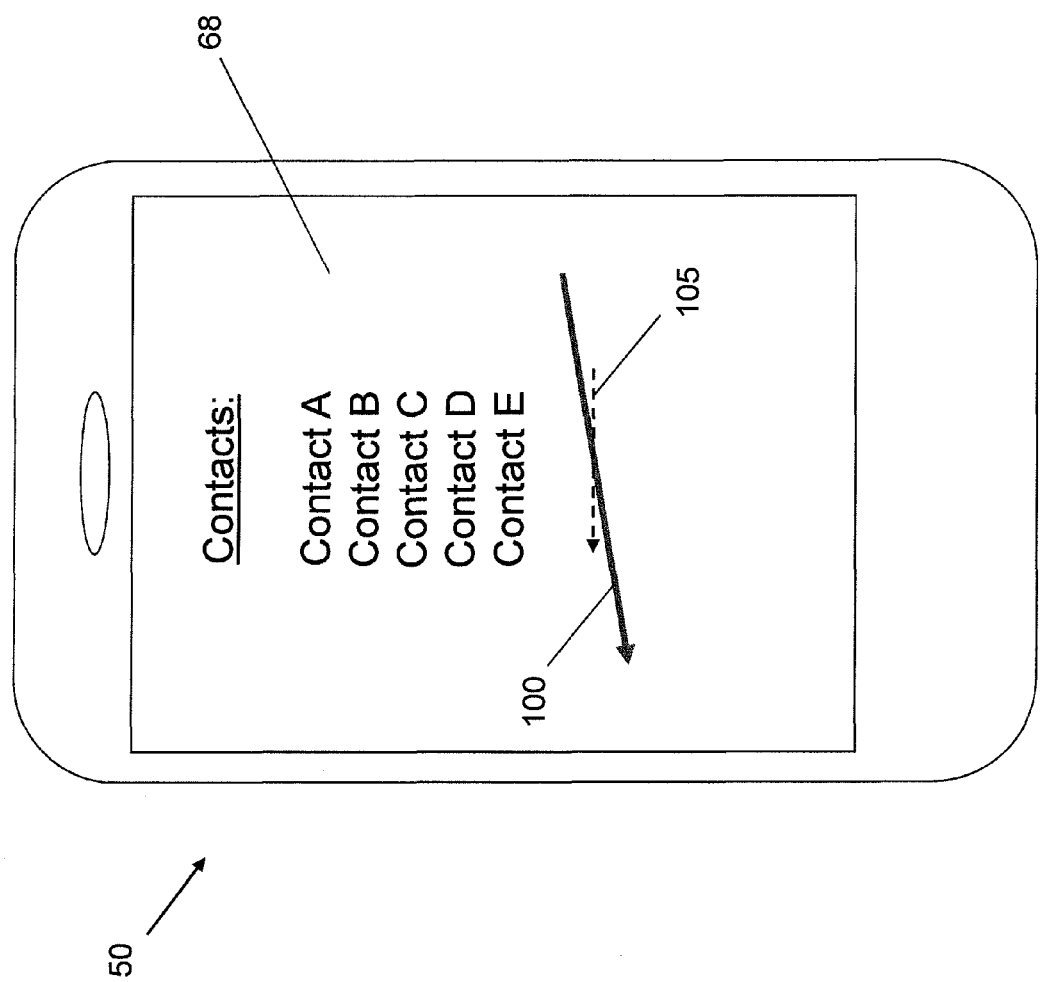

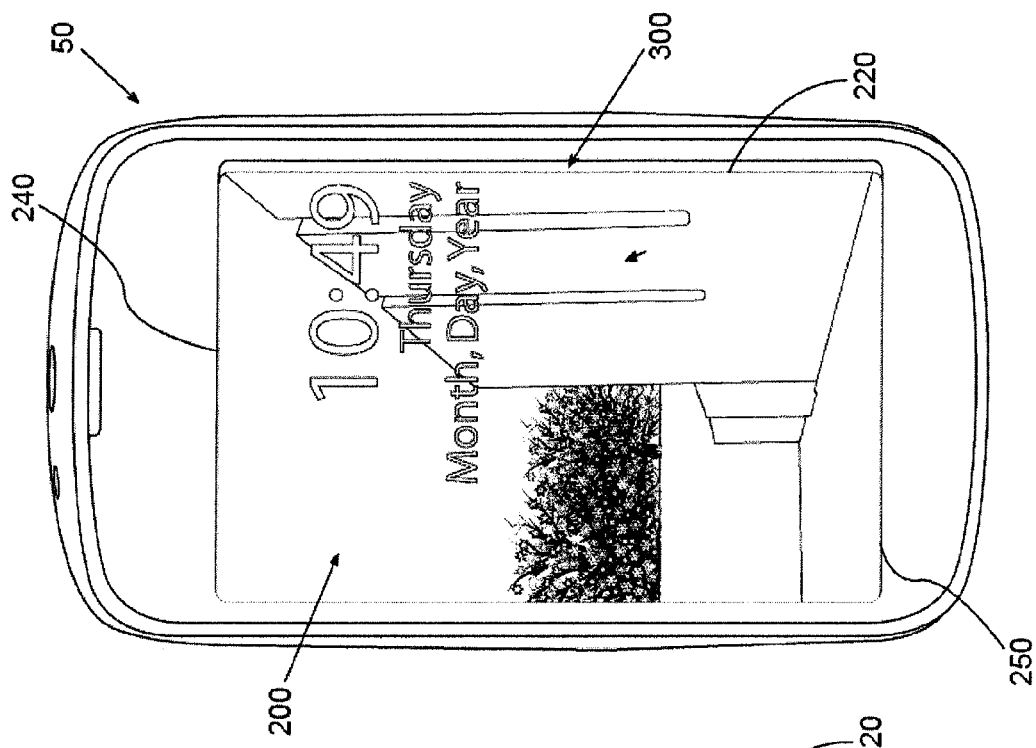
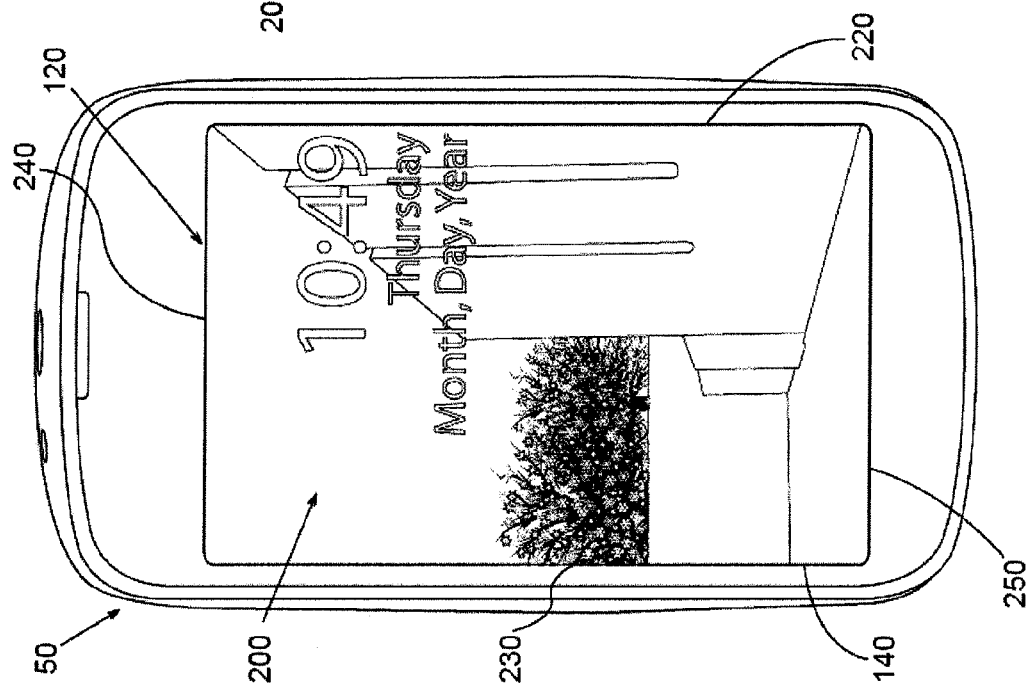

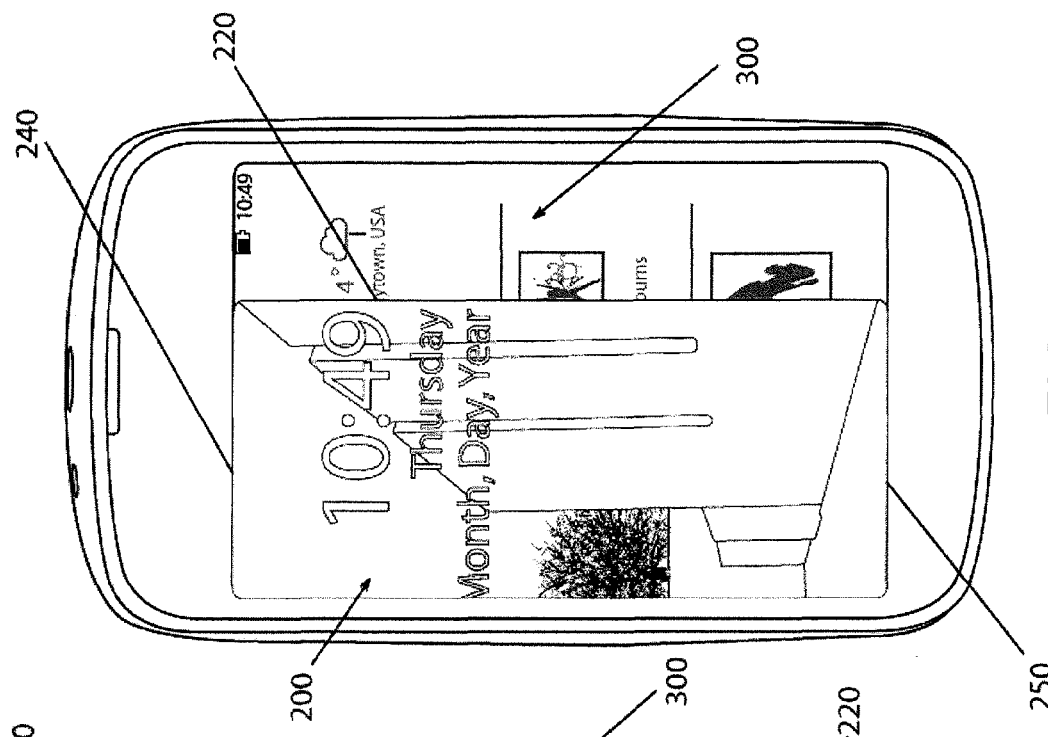
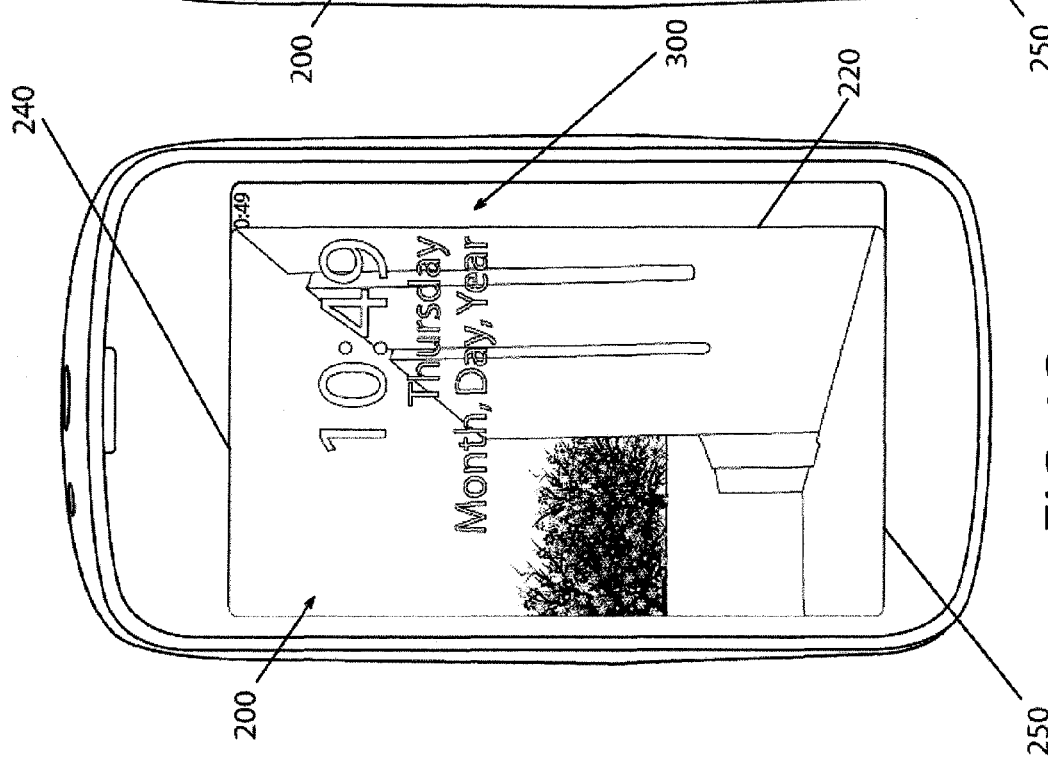

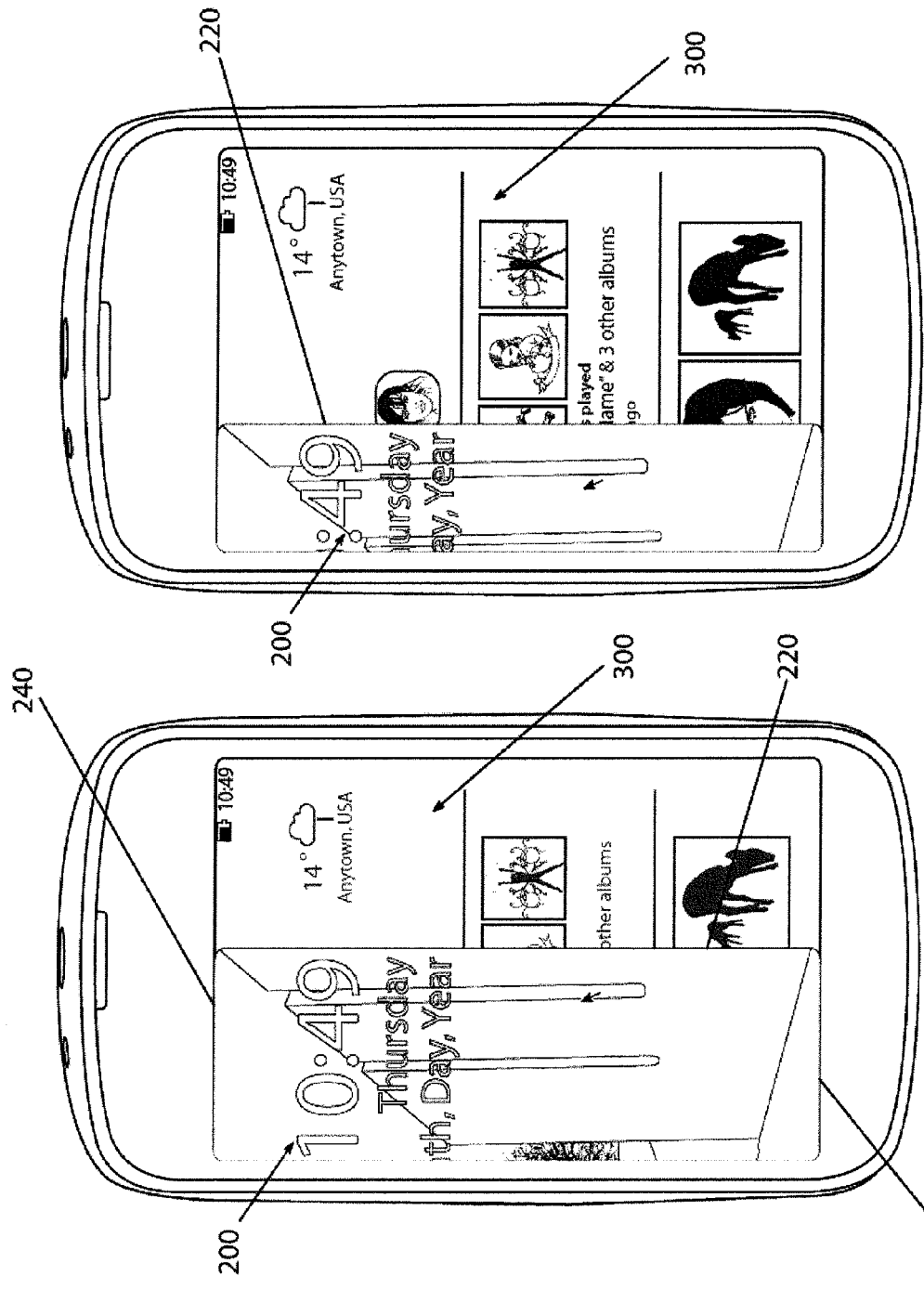

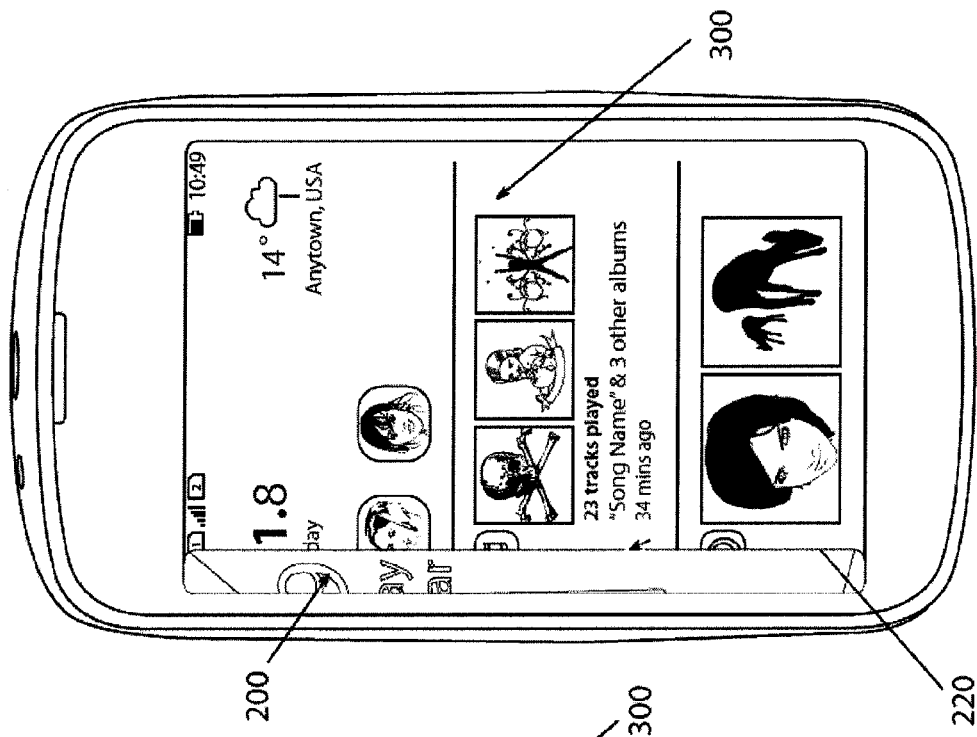
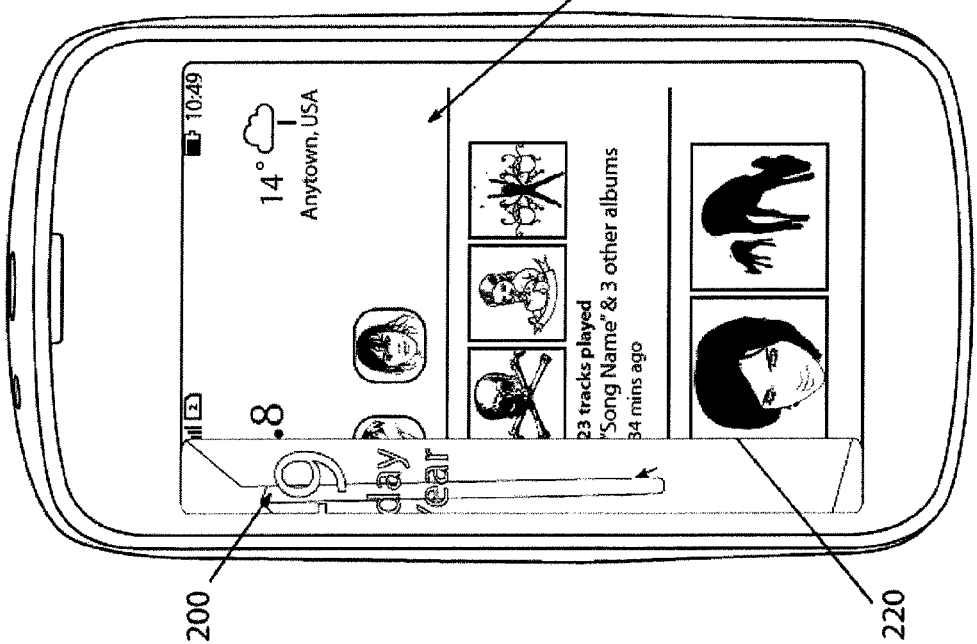
FIG. 4H
FIG. 4G

APPARATUS AND METHOD FOR PROVIDING A VISUAL TRANSITION BETWEEN SCREENS

TECHNOLOGICAL FIELD

Embodiments of the present invention relate generally to providing a visual transition between screens displaying different interactive content on displays of devices by applying different graphical effects to the screens.

BACKGROUND

Advancements in mobile device technology have provided mobile devices, such as cellular telephones and portable digital assistants (PDAs), that have increased functionality and allow users greater access and control of information. Users may access a number of screens displaying information, may navigate between screens, and may manipulate the information presented on the screens to arrange the information in a way that suits the user's preferences. Moreover, some of the screens accessed by the user may comprise information associated with one or more programs that may or may not be in execution. For example, some programs may be running, while other programs may be dormant, but may be invoked upon user interaction with a representation of the program (such as an icon).

The portable nature of mobile devices generally means that the size of the displays provided on the mobile devices is relatively small. Thus, users may, at times, only see portions of the information they have accessed depending on how much information can be presented within the area of the display provided.

Accordingly, it may be desirable to provide an improved mechanism for conveying to the user which screens are being accessed and for allowing the user to see larger portions of those screens to which the user is navigating during the transition process.

BRIEF SUMMARY OF EXAMPLE EMBODIMENTS

Accordingly, embodiments of an apparatus, method, and computer program product are described that can provide for a visual transition from a first screen of interactive content to a second screen of interactive content. In particular, embodiments of an apparatus for providing for a visual transition between screens may include at least one processor and at least one memory including computer program code. The at least one memory and the computer program code may be configured to, with the processor, cause the apparatus to at least provide for display of a first screen representing a first interactive content, receive an input from a user comprising a movement component, and provide for a visual transition from the first screen to a second screen representing a second, different interactive content in response to the input. The visual transition may be provided for by applying a first graphical effect to the display of the first screen and applying a second graphical effect to the display of the second screen, the first graphical effect being different from the second graphical effect. The first graphical effect may be indicative of a transition from display of the first screen to non-display of the first screen, and the second graphical effect may be indicative of a transition from non-display of the second screen to display of the second screen. Furthermore, the visual transition may be proportional to the movement component.

One of the first or second graphical effects may be a fade effect, a zoom effect, a pan effect, or a folding effect. In some cases, the first graphical effect may comprise a directional component along a first axis and the second graphical effect may comprise a directional component along a second axis, where the first axis is different from the second axis. Moreover, the movement component of the input may comprise a directional component, and the directional component of the input may be substantially the same as the directional component of one of the first or second graphical effects.

The first interactive content may comprise different information than the second interactive content. Additionally or alternatively, the first interactive content may be configured to allow the user to interact with the first interactive content according to a first set of rules, and the second interactive content may be configured to allow the user to interact with the second interactive content according to a second set of rules. In some cases, the memory and computer program code may be configured to, with the processor, cause the apparatus to provide for display of a viewing area, and the display of at least one of the first screen or the second screen may be provided in a portion of the viewing area.

In other embodiments, a method and a computer program product are described for providing for a visual transition from a first screen of interactive content to a second screen of interactive content by providing for display of a first screen representing a first interactive content, receiving an input from a user comprising a movement component, and providing for a visual transition from the first screen to a second screen representing a second, different interactive content in response to the input. The visual transition from the first screen to the second screen may be provided by applying a first graphical effect to the display of the first screen and applying a second graphical effect to the display of the second screen, where the first graphical effect is different from the second graphical effect. The first graphical effect may be indicative of a transition from display of the first screen to non-display of the first screen, and the second graphical effect may be indicative of a transition from non-display of the second screen to display of the second screen. The visual transition may be proportional to the movement component.

One of the first or second graphical effects may be a fade effect, a zoom effect, a pan effect, or a folding effect. The first graphical effect may comprise a directional component along a first axis, and the second graphical effect may comprise a directional component along a second axis, where the first axis is different from the second axis. Furthermore, the movement component of the input may comprise a directional component, and the directional component of the input may be substantially the same as the directional component of one of the first or second graphical effects.

In some cases, the first interactive content comprises different information than the second interactive content. The first interactive content may be configured to allow the user to interact with the first interactive content according to a first set of rules, and the second interactive content may be configured to allow the user to interact with the second interactive content according to a second set of rules. The method may further comprise providing for display of a viewing area, and the display of at least one of the first screen or the second screen may be provided in a portion of the viewing area.

In still other embodiments, an apparatus is described for providing for a visual transition from a first screen of interactive content to a second screen of interactive content. The apparatus includes means for providing for display of a first screen representing a first interactive content, means for receiving an input from a user comprising a movement component, and means for providing for a visual transition from the first screen to a second screen representing a second, different interactive content in response to the input by applying a first graphical effect to the display of the first screen and applying a second graphical effect to the display of the second screen, where the first graphical effect is different from the second graphical effect. The first graphical effect may be indicative of a transition from display of the first screen to non-display of the first screen, and the second graphical effect may be indicative of a transition from non-display of the second screen to display of the second screen. The visual transition may be proportional to the movement component.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 illustrates a stroke gesture including a movement component according to an example embodiment of the present invention;

FIGS. 4A-4L illustrate a visual transition according to an example embodiment of the present invention by showing the progression of the transition from the first screen to the second screen;

Figure 6:
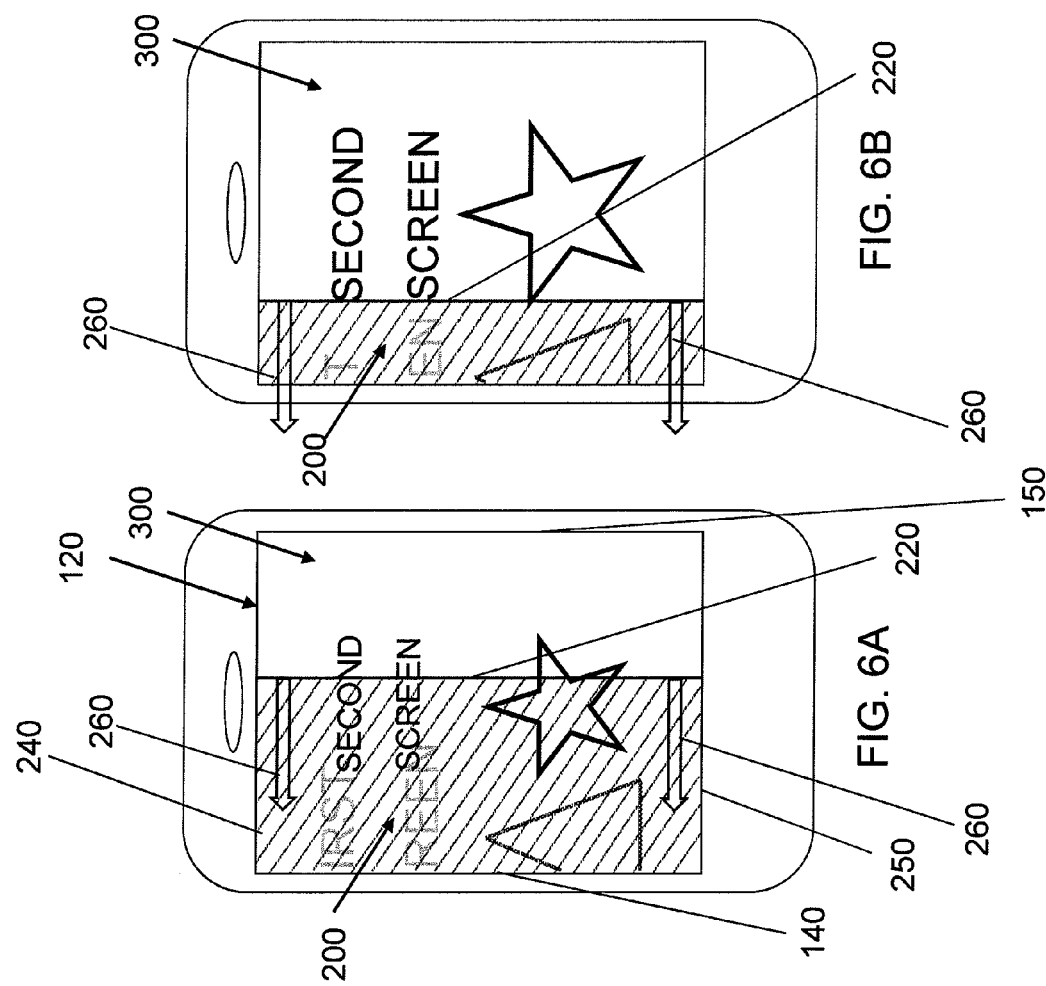
Figure 7:
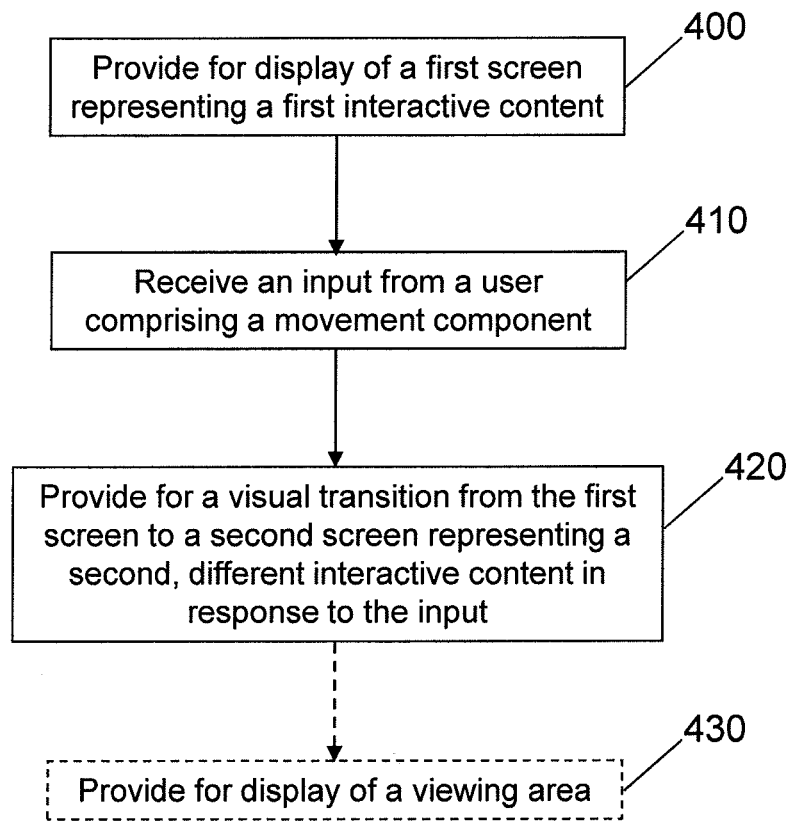

FIGS. 6A-6C illustrate a visual transition where the first graphical effect is a pan effect and the second graphical effect is a zoom effect according to an example embodiment of the present invention; and FIG. 7 illustrates a flowchart of methods of providing for a visual transition from a first screen of interactive content to a second screen of interactive content according to another example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, mobile terminals, including devices such as portable digital assistants (PDAs) and cellular telephones, are becoming smaller in size to allow for greater portability to the user. With the decrease in size of such devices, however, comes a decrease in the space available for displaying information. In other words, the size of the viewing area through which interactive content (e.g., contacts, e-mail messages, games, etc.) is presented to the user has become more limited as a result of more compact devices.

In part to compensate for this decrease in the size of the viewing area, such devices may be provided with additional functionality to allow the user to interact with and manipulate the displayed content. For example, a user may be able to zoom in on certain portions of the displayed content to read small print and may be able to pan (e.g., shift the displayed image in a particular direction) to view portions of the content that were previously outside the viewing area. In addition, the user may be able to expand certain aspects of the displayed content, such as to view details regarding a particular displayed icon or indication, launch a program, or open a new window within the viewing area.

The user's ability to manipulate the display and arrangement of content, however, may in some cases cause the user to forget the original configuration of the displayed content and/or how the user arrived at the current display configuration. For example, as a result of a touch input received via a touch screen display to pan the displayed screen to the left, the displayed screen may be shifted over to the extent that it appears to the user that a new screen has replaced the previously displayed screen. Similarly, a touch input may be received to switch from displaying one program (e.g., an e-mail application) to another program (e.g., a music player), and as a result the screen corresponding to the first program (the e-mail application) may shifted out of the viewing area to be replaced by the new screen corresponding to the second program (the music player). Because the touch inputs for executing both scenarios may be similar, and because the transition from one screen to the other in each scenario may have a similar visual appearance, the user may be confused as to whether the newly displayed screen is part of the original content with which the user was interacting (e.g., part of the content that was previously outside the viewing area) or represents new interactive content (e.g., a different program).

In addition, during the transition process itself, only portions of the new screen may be displayed to the user as the previous screen is transitioning from a state of display to a state of non-display. For example, only portions of the new screen that are gradually revealed as the old screen is moved away or dissipated may be viewable to the user. Thus, the user may not be able to determine whether the new screen is the desired screen until the old screen is completely or nearly completely removed.

Accordingly, embodiments of the present invention provide for a visual transition between screens that indicates to the user that the user is "leaving" (e.g., transitioning away) from one screen and is "entering" (e.g., transitioning to) another screen by applying different graphical effects to each screen. In other words, a first graphical effect may be applied to the first screen (e.g., the screen originally displayed to the user representing a first interactive content), and the first graphical effect may be indicative of a transition from display of the first screen to non-display of the first screen. Likewise, a second graphical effect may be applied to the second screen (e.g., the screen being invoked by the user that is to replace the first screen, which represents a second interactive content), and the second graphical effect may be indicative of a transition from non-display of the second screen to display of the second screen.

The first and second graphical effects may, together, create for the user a visual transition from the first screen to the second screen and may, thus, serve to help the user understand that he or she is navigating from the display of a first interactive content to a display of a second, different interactive content (e.g., rather than navigating between different portions of the same interactive content). Moreover, the visual transition may help the user remember that he or she has navigated from the first interactive content to the second interactive content so that, if necessary, the user may be able to invoke the display of other screens or navigate back to the first screen representing the first interactive content. In this way, for example, if the user transitions to a second screen in error and discovers that the second interactive content represented is not the desired content, the user may navigate to a third screen representing a third interactive content or back to the first screen. Said differently, providing a visual transition may help the user associate the input he or she provides with the result caused by the input (e.g., the transitioning from one screen to another) such that interaction with the displayed interactive content may be facilitated. Furthermore, the first and second visual effects may be tailored to allow the user to see more of the second screen during the transition process, such that the user may be able to determine sooner whether the second screen is the desired screen.

Figure 1:
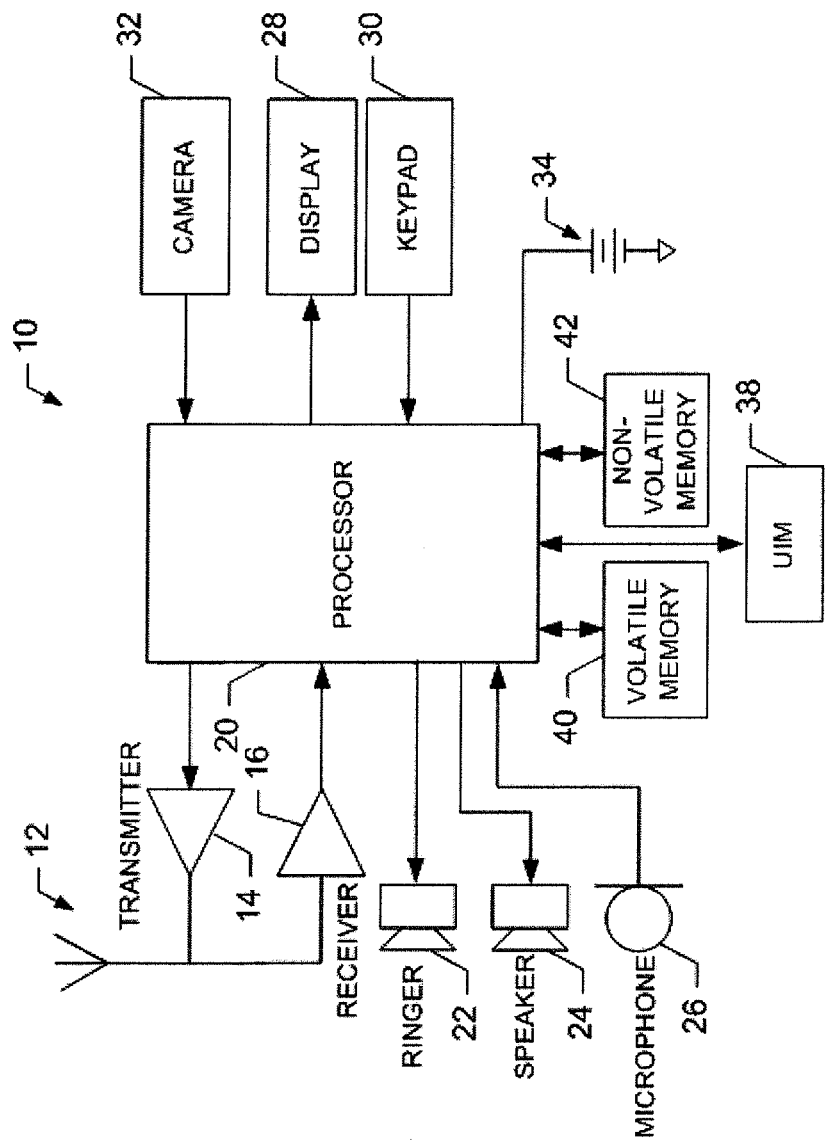
FIG. 1 illustrates one example of a communication system according to an example embodiment of the present invention.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include a proximity component and/or an orientation component, as described below. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing for a visual transition between screens representing different interactive content. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
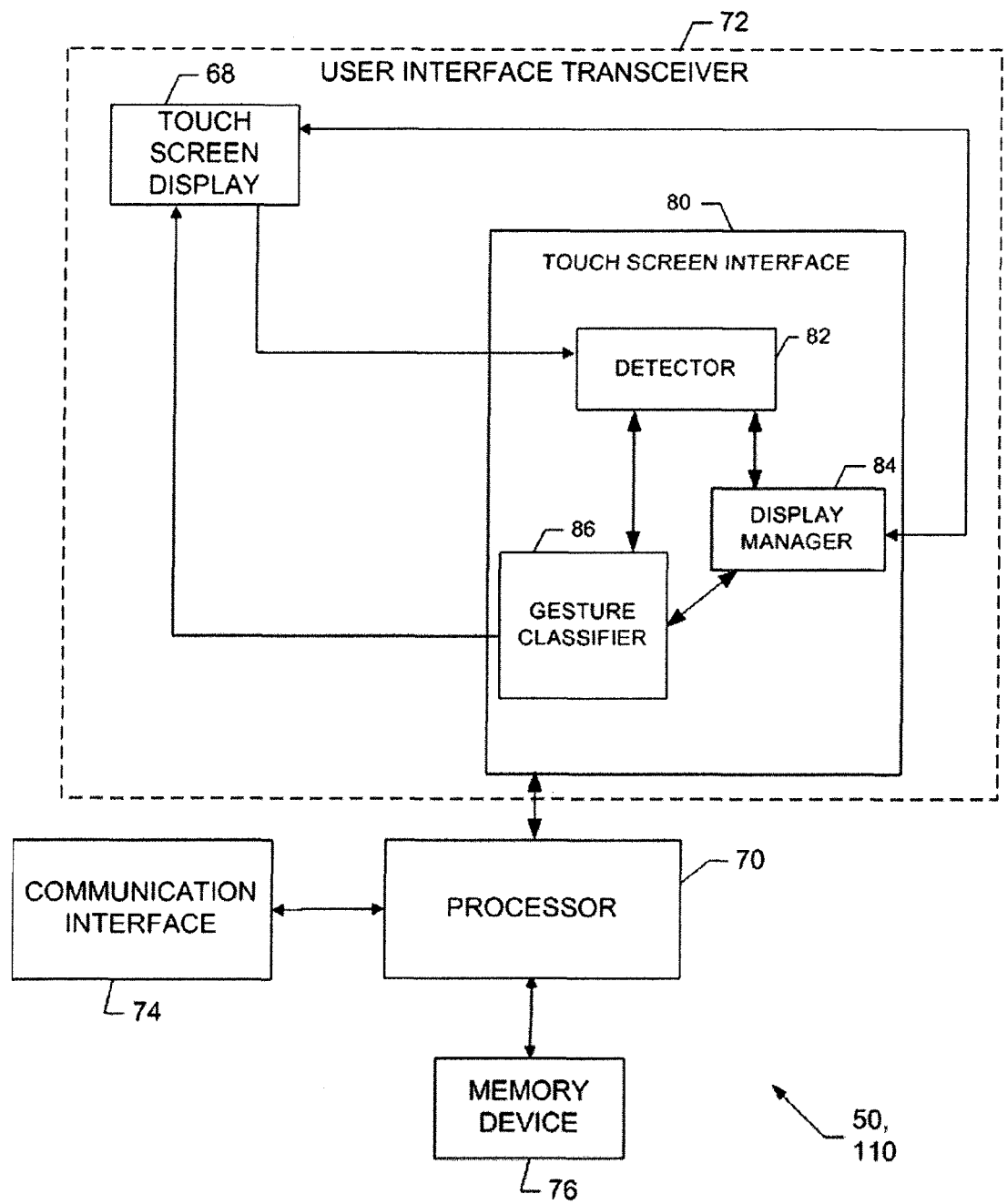
FIG. 2 illustrates a schematic block diagram of an apparatus for providing for a visual transition from a first screen of interactive content to a second screen of interactive content according to an example embodiment of the present invention.

It should also be noted that while FIG. 2 illustrates one example of a configuration of an apparatus for providing a visual transition between screens representing different interactive content, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for providing for a visual transition between screens representing different interactive content may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

A touch may be defined as a touch event that impacts a single area (without or with minimal movement on the surface of the touch screen display 68) and then is removed. A multi-touch may be defined as multiple touch events sensed concurrently (or nearly concurrently). A stroke may be defined as a touch event followed immediately by motion of the object initiating the touch event while the object remains in contact with the touch screen display 68. In other words, the stroke may be defined by motion following a touch event thereby forming a continuous, moving touch event defining a moving series of instantaneous touch positions (e.g., as a drag operation or as a flick operation). As such, a stroke 100 (shown in FIG. 3) may include a contact component A (e.g., initial contact with the touch screen display 68), a movement component (e.g., motion of the object contacting the touch screen display while the object remains in contact, represented by the arrow 100), and/or a direction component (e.g., the direction of motion of the object across the touch screen display). In some cases, the direction component may be a nominal direction that is not identical to the direction of the movement component (e.g., a direction that is not the actual or instantaneous direction of the movement of the object across the touch screen display 68), as shown in FIG. 3 via the dashed arrow 105. Multiple strokes and/or touches may be used to define a particular shape or sequence of shapes to define a character or symbol.

A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Turning now to FIGS. 4A-4L, in general, an apparatus 50 is provided, such as an apparatus embodied by the mobile terminal 10 of FIG. 1 (e.g., a cellular phone) that has or is otherwise associated with a touch screen display 68. As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to at least provide for display of a first screen 200 representing a first interactive content. The apparatus may be further caused to receive an input from a user comprising a movement component, such as a stroke 100 (FIG. 3). Although the embodiments depicted in the figures and used in the examples herein refer to a touch screen display 68 configured to receive touch inputs, the inputs may be provided to a non-touch display and/or via non-touch user input devices, such as a keypad or mouse. In response to the input, the apparatus 50 may be caused to provide for a visual transition from the first screen 200 to a second screen 300 (shown, e.g., in FIG. 4L), where the second screen represents a second, different interactive content.

Figure 4J:
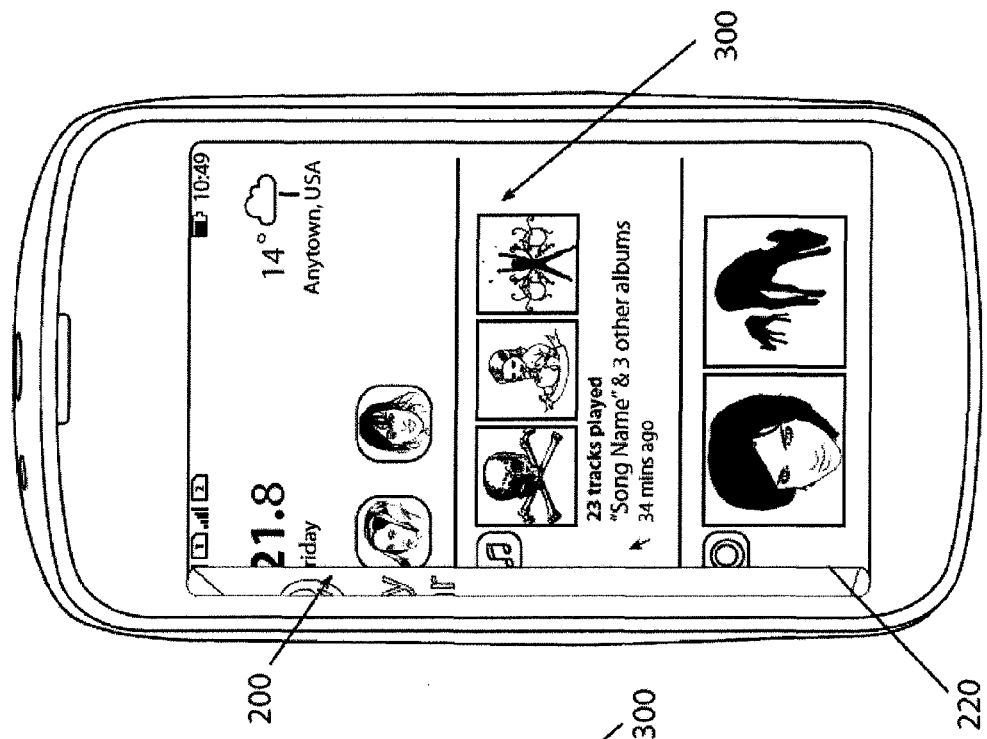
Figure 4I:
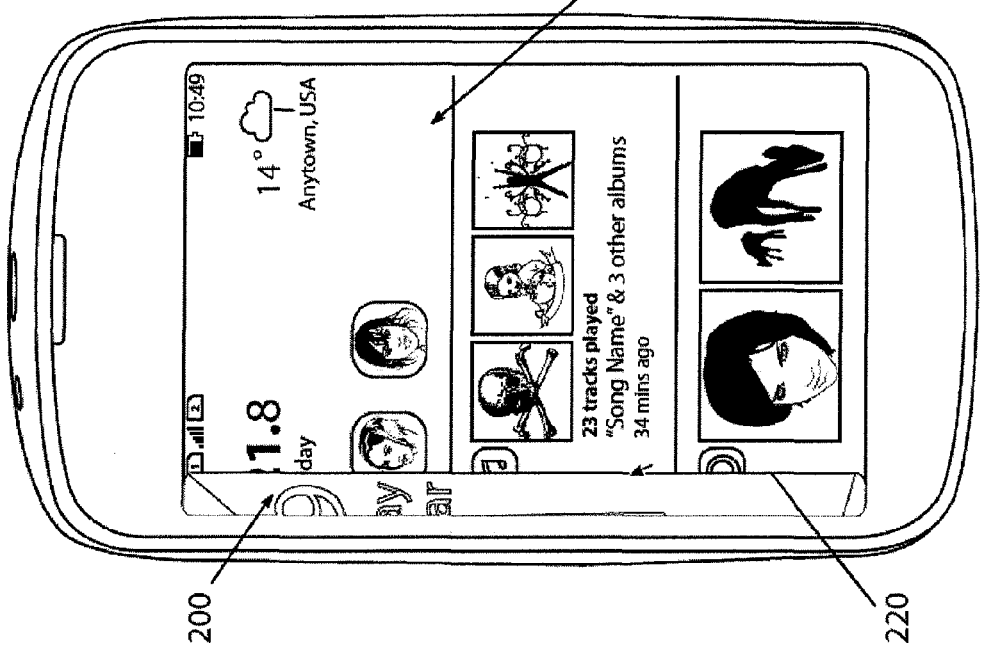
Figure 4L:
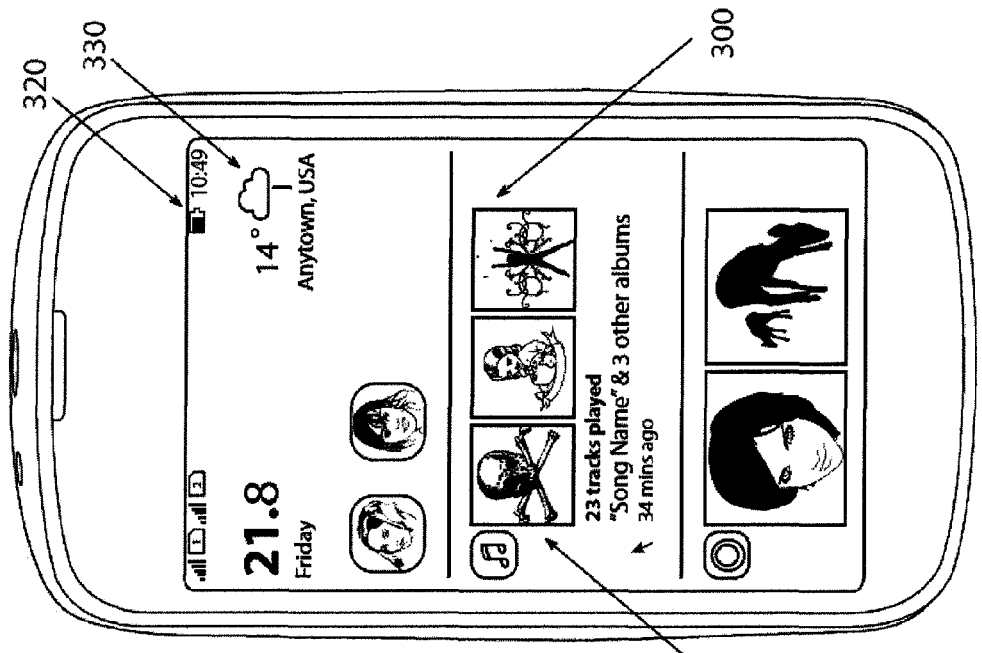
Figure 4K:
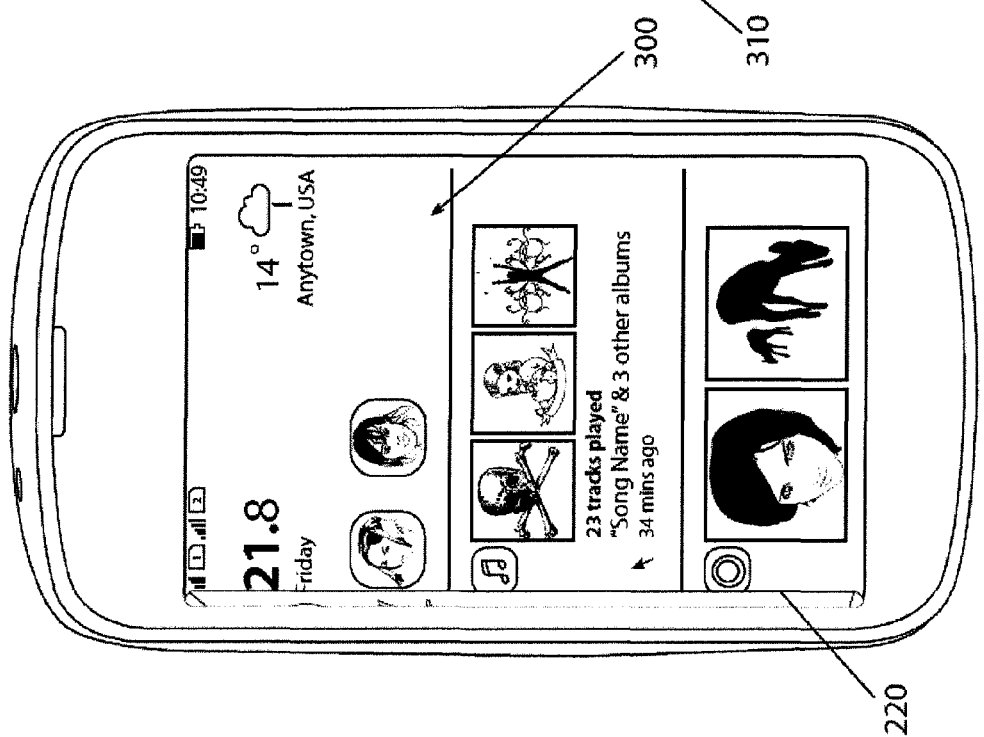

FIGS. 4A through 4L present a sequence of images that illustrate the progression of an example of the visual transition that may be provided. With reference to the figures, the visual transition may be provided by applying a first graphical effect to the display of the first screen 200 and applying a second graphical effect to the display of the second screen, the first graphical effect being different from the second graphical effect, as described in greater detail below. The first graphical effect is indicative of a transition from display of the first screen 200 (FIG. 4A) to non-display of the first screen (FIG. 4L), whereas the second graphical effect is indicative of a transition from non-display of the second screen 300 (FIG. 4A) to display of the second screen (FIG. 4L). Thus, the combined result of the first and second graphical effects is to convey to the user a visual transition from the first screen 200 to the second screen 300, while at the same time indicating to the user which screen the user is transitioning away from (e.g., to a state of non-display) and which screen the user is transitioning to (e.g., to a state of display).

As used herein, the term "interactive content" refers to information presented to the user via the display 68 (FIG. 2) or the display 28 (FIG. 1), either graphical (such as using icons, photos, illustrations, etc.) or textual, with which the user may interact in a particular way for a particular purpose. For example, as shown in the example depicted in FIGS. 4A-4L, the first interactive content may include information that is presented to the user as part of an idle screen, such as the current time, the day of the week, the date, and a background image. The first interactive content may be configured such that the user can only interact with the content in a very limited manner, such as by shifting the content over to one side to change the state of the apparatus from idle to active. Thus, the purpose of the first interactive content may be to provide information to the user (e.g., providing time and date information to the user) and to guard against the accidental entry of user input, such as through the user's incidental and unintentional contact with the display 68.

Continuing this example, the second interactive content (shown in FIG. 4L) may include a summary of recent activities undertaken by the user via the device (e.g., music played or available), the current weather, recent phone calls, and/or a list of programs that may be launched by the user. The second interactive content may be configured such that the user can more fully interact with the content, such as by selecting an icon to launch a program, expanding a displayed item to access details or further information, modify device settings, etc. Thus, the purpose of the second interactive content in this case may be to receive input from the user and to execute certain operations based on the input received.

The particular arrangement and presentation of interactive content is described herein as being provided via "screens" that are displayed to the user upon the display 68 of the apparatus. As noted above, the first screen 200 thus represents the first interactive content, and the second screen 300 represents the second interactive content. In other words, each screen presents to the user a collection of content elements that make up the respective interactive content. In FIG. 4A, for example, the displayed time (10:49) is a content element of the first screen 200 and is part of the first interactive content. The screen may be configured such that a graphical effect that is applied to the screen (e.g., in response to receipt of a user's touch input to a particular area of the screen) may be applied to all of the interactive content represented on the respective screen. Thus, referring again to the example illustrated in FIGS. 4A-4L, panning of the first screen 200 to the left via a stroke touch event may serve to shift all of the first interactive content displayed on the first screen to the left, including content that may not have been directly contacted by the user's touch input (stroke).

Figure 5:
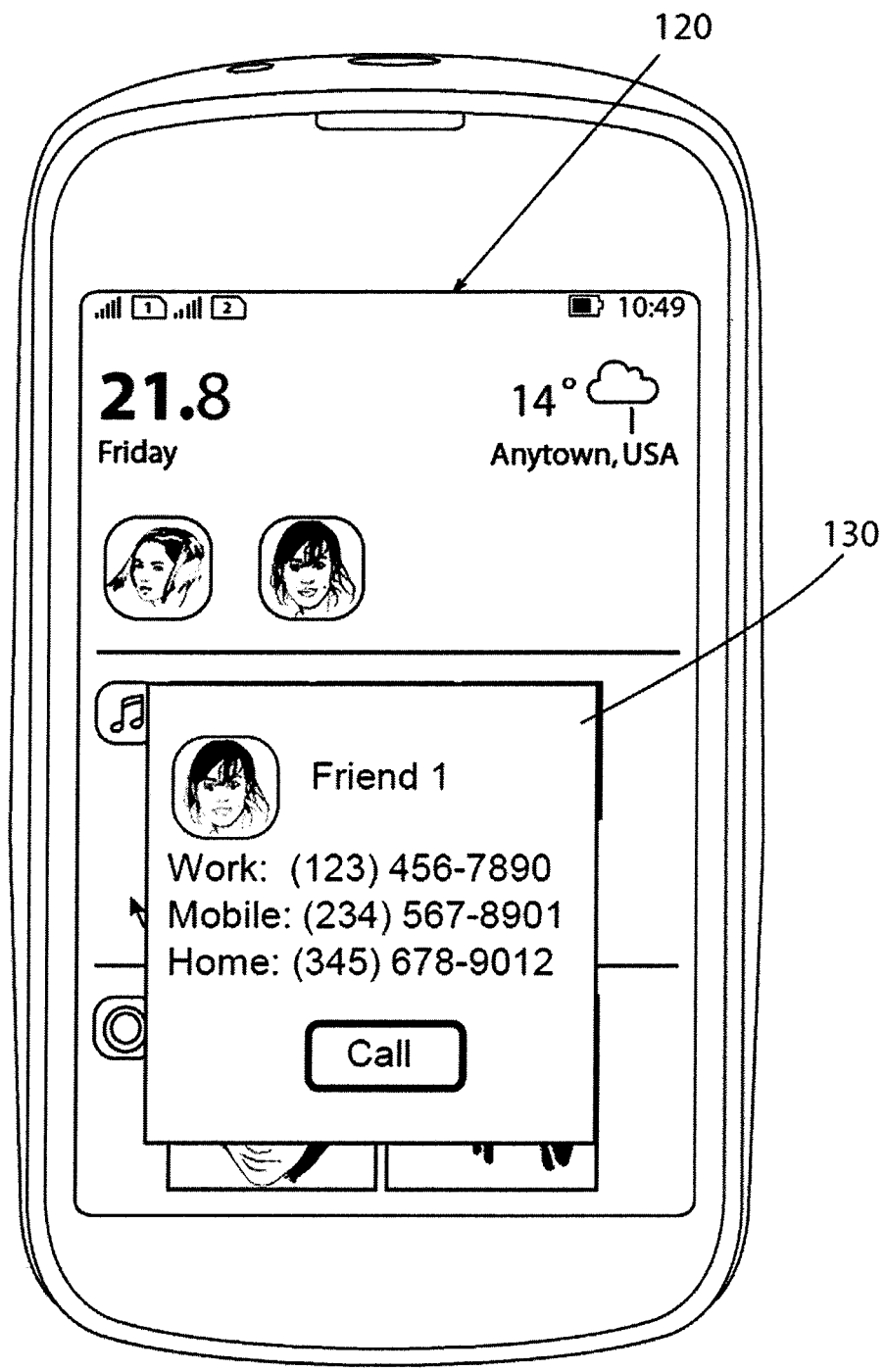
FIG. 5 illustrates a screen that is displayed in only a portion of the viewing area provided according to an example embodiment of the present invention.

In the depicted examples of FIGS. 4A and 4L, each respective screen is displayed using the entire viewing area provided on the apparatus 50. In other embodiments, however, such as shown in FIG. 5, the memory and computer program code may be configured to, with the processor, cause the apparatus to provide for display of a viewing area 120, and the display of at least one of the first screen or the second screen may be provided in a portion of the viewing area. Said differently, the viewing area 120 may, in some cases, be larger than the portion of the screen that is displayed for the user (which may be, for example, a portion of the first or second screen) and may be considered, for example, a virtual display area 130 (e.g., a window) within the larger viewing area.

As noted above, in some cases the screen may be larger than the viewing area, such that the entire screen does not fit within the bounds of the viewing area (e.g., the entire screen cannot be displayed to the user at the same time). In such a case, the user may provide an input to pan the screen so as to view portions of the screen that may be outside the viewing area. The input to perform panning within the same screen may, thus, be different from the input for invoking a transition from the first screen to the second screen. For example, transitioning from the first screen to the second screen may require that the touch component of the input (e.g., the initial contact with the touch screen display) be received at an edge of the display, whereas panning within the same screen (e.g., within the first screen) may require that the touch component of the input be received in an area of the display spaced away from the edge.

Accordingly, in some cases, the first interactive content may comprise different information than the second interactive content. In the example shown in FIGS. 4A-4L, the second interactive content 300 includes additional information as compared to the first interactive content 200, such as icons 310 for launching a program to play music, an indication of battery life 320, and an indication of the current weather 330.

Alternatively or additionally, the first interactive content may be configured to allow the user to interact with the first interactive content according to a first set of rules, and the second interactive content may be configured to allow the user to interact with the second interactive content according to a second set of rules. With reference to FIG. 4A, for example, the first screen 200 may be configured such that only a stroke touch event that includes a movement component and that has a directional component to the left is registered as an input (the result of which, in this case, is the panning of the screen). Other inputs that do not satisfy these criteria, such as a simple touch, multi-touch, pinch, tap, press, or long press (among others) would not be recognized as inputs and would be disregarded by the apparatus. Similarly, the second screen 300 (FIG. 4L) may be configured such that only touch events received at certain locations of the touch screen display are registered as inputs. Moreover, the operation executed upon receipt of the input may depend on the location at which the touch event is received. Thus, a touch event in a blank area of the screen, for example, may not cause any operation to be executed.

Referring now to FIGS. 4A-4L and FIGS. 6A-6C, various types of graphical effects may applied to the first and second screens 200, 300, the combination of which is configured to provide for a visual transition from the first screen to the second screen. One of the first or second graphical effects may be, for example, a fade effect, a zoom effect, a pan effect, a folding effect (e.g., where the screen appears to fold onto itself to get smaller or be unfolded to grow larger), or a combination of these effects, in addition to other effects.

In the depicted embodiment, for example, a pan effect is applied to the first screen, whereas a zoom effect is applied to the second screen. Thus, upon receipt of a stroke gesture in this example, the first screen 200 may be shifted with respect to the available viewing area 120 (e.g., the area of the touch screen display), as shown by the arrows 260 in FIGS. 6A and 6B, until the first screen has been moved outside of the viewing area and the second screen has taken its place.

In this regard, the first screen may define a right side edge 220, a left side edge 230, a top edge 240, and a bottom edge 250 (FIG. 4A). As the stroke gesture (not shown) is received, the right side edge 220 may be moved to the left, such that the left side edge 230 is shifted outside the viewing area 120 and the right side edge 220 gets progressively closer to the left edge 140 of the viewing area. This progression is shown in the example depicted in FIGS. 4A-4L.

As the first screen 200 pans to the left (e.g., as the first graphical effect, in this case a pan effect, is applied to the first screen), the second screen 300 may be gradually revealed to the right of the right side edge 220 in this example (FIGS. 4B-4K) until, in FIG. 4L, the second screen has replaced the first screen. As part of the transition, a second graphical effect may be applied to the second screen 300.

In the example shown in FIGS. 4A-4L, the second graphical effect that is applied to the second screen 300 comprises a combination of a fade effect (the second interactive content that is displayed grows progressively brighter as the second screen is revealed) and a zoom effect (the second interactive content grows progressively larger as the second screen is revealed). For example, at least some of the content elements appear brighter in FIG. 4L and are larger in FIG. 4L as compared to, for example, FIG. 4D (in which only a small portion of the second screen 300 has been revealed).

In some cases, the second graphical effect is applied concurrently with the first graphical effect on the respective screens, such that, in the example described above, the second interactive content displayed via the second screen would grow progressively brighter and larger starting at substantially the same time that the first screen begins to pan from the right to the left and ending at substantially the same time that the first screen is moved completely outside the viewing area. Said differently, the second graphical effect may be applied over substantially the same time period that the first screen is transitioned from a state of display to a state of non-display.

In other cases, however, the second graphical effect may only be applied to the second screen during or overlapping with only a portion of the time over which the first graphical effect is applied to the first screen. For example, in FIGS. 6A-6C, the first graphical effect applied to the first screen 200 (shown using diagonal lines to allow the entirety of the second screen 300 to be seen for purposes of explanation) is a pan effect, and the second graphical effect is a zoom effect. The second screen 300, in this example, may only begin growing larger once a threshold portion of the second screen has been revealed to the user (e.g., once 60% of the second screen is visible to the user, depicted in FIG. 6B). In this way, the second screen may appear to "pop-out" to the user (e.g., between FIGS. 6B and 6C in the depicted example). In addition, this delay may ensure that the second screen is presented at a minimum size that is readable to the user.

As noted above, the first and second graphical effects are selected so as to indicate to the user whether the respective screen is one that is going from a state of display to a state of non-display or vice versa. Thus, each of the first and second graphical effects may be dependent, at least in part, on the particular type of transition that is occurring. Accordingly, when the user is transitioning from the first screen to the second screen, the first graphical effect may be applied to the first screen and the second graphical effect may be applied to the second screen; however, if the user is transitioning from the second screen to the first screen, the first graphical effect would be applied to the second screen and the second graphical effect would be applied to the first screen.

Moreover, the first graphical effect and the second graphical effects are different transition effects. Thus, if the first graphical effect is a pan effect, the second graphical effect may be any effect other than a pan effect. Likewise, if the first graphical effect is a zoom effect, the second graphical effect may be any effect other than a zoom effect. Thus, if the first graphical effect is a "zoom out" effect, in which the first interactive content that is displayed grows progressively smaller, the second graphical effect may be any effect other than a "zoom out" or a "zoom in" effect, (a "zoom in" effect being considered the same graphical effect as a "zoom out" effect, one being the inverse of the other).

In some embodiments, the first graphical effect may comprise a directional component along a first axis and the second graphical effect may comprise a directional component along a second axis, and the first axis may be different from the second axis. With reference to FIGS. 6A-6C, for example, the first graphical effect (e.g., a pan effect) may include a directional component along the X-axis (e.g., in the −X direction), while the second graphical effect (e.g., a zoom effect) may include a directional component along the Z-axis (e.g., in the +Z direction, or out of the page, simulated by a growth in size in a device with a 2D display).

Furthermore, the movement component of the input (e.g., the stroke gesture described in the examples above) may include a directional component (e.g., movement to the left), and the directional component of the input may be substantially the same as the directional component of one of the first or second graphical effects. Thus, in the example illustrated in FIGS. 6A-6C, the directional component of the input (in the −X direction for the stroke to the left) is substantially the same as the directional component of the pan effect applied to the first screen, shown by the arrows 260.

Accordingly, in some embodiments, the visual transition (e.g., the combination of the first and second effects as perceived by the user) from the first screen to the second screen may be proportional to the movement component of the input. Thus, as the user applies a stroke gesture to the touch screen display, the first screen may move from a state of display to a state of non-display and the second screen may move from a state of non-display to a state of display at a speed that is proportional to the speed at which the input was applied by the user. Moreover, the user may, in some cases, reverse the visual transition by reversing the direction of the stroke gesture if the stroke gesture has not yet been completed (e.g., the user's finger is still contacting the touch screen display). Thus, the reversion of the first screen toward its original state of display and the reversion of the second screen toward its original state of non-display may likewise occur at a speed that is proportional to the speed of the reverse stroke gesture. In other cases, however, the first graphical effect may be automatically applied upon receipt of at least a portion of the stroke gesture (e.g., may not be controllable by the user), such that the stroke gesture in this example could not be reversed once initiated.

Although the examples above describe a user input in the form of a stroke gesture from a right side of the display to a left side of the display, various other inputs may be used depending on the type of device and/or how the device is configured to receive user input and present information. In some cases, for example, the user may provide a stroke gesture from an area at the top of the display toward an area at the bottom of the display, and the first graphical effect applied to the first screen in response may comprise a pan effect that shifts the first screen down. As another example, with respect to a 3D display, the user input may comprise a user "pushing" the first screen backward (e.g., in the –Z direction), with the second graphical effect applied to the second screen comprising a different effect, such as the second screen sliding into the viewing area from the edge of the viewing area. Moreover, the user input may be received via interaction with the first screen, the second screen, or, in some cases, a portion of the viewing area that is not part of either the first screen or the second screen (such as a toolbar or a "tab" that is present regardless of which screen is displayed). For example, the user may provide a stroke gesture downward starting from an edge of the second screen that may be visible above a top edge of the first screen. The downward stroke may, in turn, result in a pan effect that pulls the second screen downward over the first screen, and zoom effect may be applied to the first screen that may cause the first screen to "pop in" (e.g., into the page in the –Z direction).

FIG. 7 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for providing a visual transition between screens representing different interactive content, as shown in FIG. 7, includes providing for display of a first screen representing a first interactive content at Block 400, receiving an input from a user comprising a movement component at Block 410, and providing for a visual transition from the first screen to a second screen representing a second, different interactive content in response to the input at Block 420 by applying a first graphical effect to the display of the first screen and applying a second graphical effect to the second screen, the first graphical effect being different from the second graphical effect, as described above. The visual transition may be proportional to the movement component. Moreover, the first graphical effect may be indicative of a transition from display of the first screen to non-display of the first screen, and the second graphical effect may be indicative of a transition from non-display of the second screen to display of the second screen.

As noted above, in some cases one of the first or second graphical effects is a fade effect, a zoom effect, a pan effect, or a folding effect. The first graphical effect may comprise a directional component along a first axis, and the second graphical effect may comprise a directional component along a second axis, where the first axis is different from the second axis. Thus, in some cases, the movement component of the input may comprise a directional component, and the directional component of the input may be substantially the same as the directional component of one of the first or second graphical effects.

In some embodiments, the first interactive content may comprise different information than the second interactive content. Furthermore, the first interactive content may be configured to allow the user to interact with the first interactive content according to a first set of rules, and the second interactive content may be configured to allow the user to interact with the second interactive content according to a second set of rules, as described above. In some cases, the method may further include providing for display of a viewing area at Block 430, where the display of at least one of the first screen or the second screen is provided in a portion of the viewing area.

In some embodiments, certain ones of the operations above may be modified or further amplified as described below. Furthermore, in some embodiments, additional optional operations may be included, some examples of which are shown in dashed lines in FIG. 7. Modifications, additions, or amplifications to the operations above may be performed in any order and in any combination.

In an example embodiment, an apparatus for performing the method of FIG. 7 above may comprise a processor (e.g., the processor 70 of FIG. 2) configured to perform some or each of the operations (400-430) described above. The processor may, for example, be configured to perform the operations (400-430) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 400 and 420 may comprise, for example, the user interface transceiver 72, the communication interface 74, the processor 70, the memory device 76, and/or a device or circuit for executing instructions or executing an algorithm for processing information as described above. Examples of means for performing operation 410 may comprise, for example, the user interface transceiver 72, the processor 70, the memory device 76, and/or a device or circuit for executing instructions or executing an algorithm for processing information as described above. Examples of means for performing operation 430 may comprise, for example, the user interface transceiver 72, the processor 70, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
    cause a display to display a first screen representing a first interactive content;
    respond to a user input in which a stroke gesture comprising a movement component is initiated by causing the first screen to translate across the display, along a first axis in a first direction, which reveals a second screen, beneath the first screen, representing a second interactive content different from the first interactive content;
    respond to the user input by causing the second screen to translate along a second axis, different from the first axis, in a second direction while the first screen is translating to reveal the second screen; and
    prior to completion of the stroke gesture, respond to reversal of the stroke gesture by causing the first screen to translate across the display, along the first axis in a third direction opposite to the first direction, and by causing the second screen to translate along the second axis in a fourth direction opposite to the second direction while the first screen is moving in the third direction.

2. The apparatus of claim 1, wherein the first interactive content comprises different information than the second interactive content.

3. The apparatus of claim 1, wherein the first interactive content is configured to allow the user to interact with the first interactive content according to a first set of rules, and wherein the second interactive content is configured to allow the user to interact with the second interactive content according to a second set of rules.

4. The apparatus of claim 1, wherein the memory and computer program code are configured to, with the processor, cause the apparatus to provide for display of a viewing area, wherein the display of at least one of the first screen or the second screen is provided in a portion of the viewing area.

5. The apparatus of claim 1, wherein causing the second screen to translate along a second axis provides a zoom effect.

6. The apparatus of claim 1, wherein the first axis is substantially perpendicular to the second axis.

7. The apparatus of claim 1, wherein translation of the second screen along the second axis in the second direction begins when a threshold portion, but not all, of the second screen has been revealed by translation of the first screen.

8. A method comprising:
    causing a display to display a first screen representing a first interactive content;
    responding to a user input in which a stroke gesture comprising a movement component is initiated by causing the first screen to translate across the display, along a first axis in a first direction, which reveals a second screen, beneath the first screen, representing a second interactive content different from the first interactive content;
    responding to the user input by causing the second screen to translate along a second axis, different from the first axis, in a second direction while the first screen is translating to reveal the second screen; and
    prior to completion of the stroke gesture, responding to reversal of the stroke gesture by causing the first screen to translate across the display, along the first axis in a third direction opposite to the first direction, and by causing the second screen to translate along the second axis in a fourth direction opposite to the second direction while the first screen is moving in the third direction.

9. The method of claim 8, wherein the first interactive content comprises different information than the second interactive content.

10. The method of claim 8, wherein the first interactive content is configured to allow the user to interact with the first interactive content according to a first set of rules, and wherein the second interactive content is configured to allow the user to interact with the second interactive content according to a second set of rules.

11. The method of claim 8 further comprising providing for display of a viewing area, wherein the display of at least one of the first screen or the second screen is provided in a portion of the viewing area.

12. The method of claim 8, wherein causing the second screen to translate along a second axis provides a zoom effect.

13. The method of claim 8, wherein the first axis is substantially perpendicular to the second axis.

14. The method of claim 8, wherein translation of the second screen along the second axis in the second direction begins when a threshold portion, but not all, of the second screen has been revealed by translation of the first screen.

15. A computer program product comprising at least one computer-readable storage medium having computer-executable program code portions stored therein, the computer-executable program code portions comprising program code instructions for:
    causing a display to display a first screen representing a first interactive content;
    responding to a user input in which a stroke gesture comprising a movement component is initiated by causing the first screen to translate across the display, along a first axis in a first direction, which reveals a second screen, beneath the first screen, representing a second interactive content different from the first interactive content;

responding to the user input by causing the second screen to translate along a second axis, different from the first axis, in a second direction while the first screen is translating to reveal the second screen; and prior to completion of the stroke gesture, responding to reversal of the stroke gesture by causing the first screen to translate across the display, along the first axis in a third direction opposite to the first direction, and by causing the second screen to translate along the second axis in a fourth direction opposite to the second direction while the first screen is moving in the third direction.

16. The computer program product of claim 15, wherein the first interactive content comprises different information than the second interactive content.

17. The computer program product of claim 15, wherein the first interactive content is configured to allow the user to interact with the first interactive content according to a first set of rules, and wherein the second interactive content is configured to allow the user to interact with the second interactive content according to a second set of rules.

18. The computer program product of claim 15 further comprising program code instructions for providing for display of a viewing area, wherein the display of at least one of the first screen or the second screen is provided in a portion of the viewing area.

19. The computer program product of claim 15, wherein causing the second screen to translate along a second axis provides a zoom effect.

20. The computer program product of claim 15, wherein translation of the second screen along the second axis in the second direction begins when a threshold portion, but not all, of the second screen has been revealed by translation of the first screen.

* * * * *